3,460,600
INSTALLATION FOR PREPARING PULVERULENT MATERIAL FROM A LIQUID
Geert de Boer, Lippenhuizen, Netherlands, assignor to N.V. Machinefabriek Stork-Volma, Gorredijk, Netherlands
Filed Nov. 22, 1967, Ser. No. 685,067
Claims priority, application Netherlands, Dec. 9, 1966, 6617397
Int. Cl. B01d 1/16
U.S. Cl. 159—4                    4 Claims

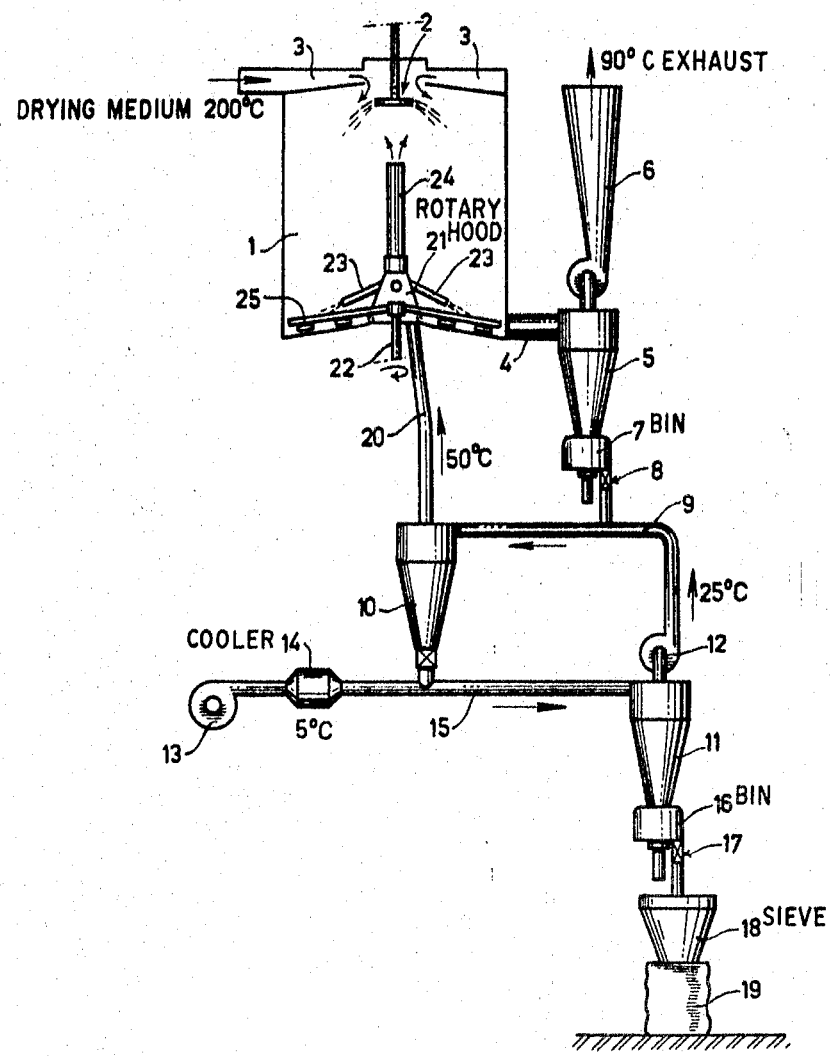

ABSTRACT OF THE DISCLOSURE

An installation for preparing pulverulent material from a liquid, comprising a spray drying chamber with an upper liquid spray device, an inlet for heated gas and an outlet, which is connected to a separator for the powder particles. The powder outlet of this separator is connected to a flow of a cooling gas leading to a cyclone. The gas outlet duct of this cyclone terminates in a zone in the drying chamber lying under the spray device.

---

My invention relates to an installation for preparing pulverulent material, such as milk powder from a liquid, said installation comprising a drying chamber which at its upper end is provided with a vaporizer for the liquid and with an inlet for heated gas disposed around this vaporizer, said chamber being provided at its lower end with a common outlet for the discharge of the powder and the gas to a separator.

A drawback of such an installation, of which a range of types are known, is in that the dimensions of the powder particles obtained differ substantially. In general the producer or consumer has only use for a definite particle size, whereby the smallest particles are less useful.

It is an object of my invention to improve such an installation so that the production of smaller particles and also the loss of these particles via the gas outlet is reduced in the best possible way. The improvement according to my invention consists in that a cooler is provided for the powder issuing from the separator, the cooler comprising a source of pressurized gas and at least one cyclone, the gas outlet of the latter being connected to the drying chamber in an area situated centrally below the vaporizer for the liquid.

Due to these features firstly the smallest particles in the gas outlet are returned to the drying chamber where they can grow to slightly larger sizes. Secondly the returned particles are prevented from being burned in the drying chamber due to the central inlet under the vaporizer so that the heated gas (the drying air) can only reach these particles after having gone through this vaporization area, whereby it has been cooled down.

According to an embodiment of my invention the connection for the cooling gas to the drying chamber is situated under a hood within this chamber, the hood being provided with a number of outflow openings directed to the bottom of the chamber, and with an orifice turned to the vaporizer. In this manner the discharge of gas from the cooling cyclone or cyclones carrying the smaller particles serves a dual purpose. In the first place the aforementioned effect of increase of the particle size is produced, while further a current of cooling air is directed, via the outflow openings, to the downwardly fluttering powder particles in the drying chamber.

The aforementioned hood is preferably rotatably supported at the lower end of the drying chamber and it is further provided with outwardly protruding scrapers. The discharge of the particles lying on the bottom of the drying chamber is also facilitated in this way.

It is a further object of my invention to enhance the efficiency of the installation by cooling the powder in its way to a storage place i.e. in this last stage, by the gas with the lowest temperature.

The foregoing and other objects and advantages of my invention will appear in the description to follow. In the description reference is made to the accompanying drawings, which form a part hereof, and in which there is shown by way of illustration and not of limitation a specific form in which the invention may be embodied.

The installation consists of a drying chamber 1 which at its upper end is provided with a vaporiser 2 and an inlet 3 for the heated gas provided around the vaporizer. At the lower end of the chamber 1 an outlet 4 is disposed through which both the powder and the gas are conveyed to a separator 5 constructed as a cyclone in this case. The cyclone 5 has a gas outlet 6 at its upper end and a powder bin 7 at its lower end. This bin 7 has an outlet 8 to a conduit 9 which forms a part of a cooling device consisting of two cyclones 10 and 11 connected in tandem. The conduit 9 is on the one hand connected, via an interposed blower 12, to the gas outlet of the cyclone 11. The other end of the conduit 9 is connected to the upper end of the cyclone 10 for feeding to this cyclone the powder issuing from the outlet 8. The cooling device comprises further a source of pressurised gas, that is to say a blower 13 which via a cooler 14 is connected to the upper end of the cyclone 11 by means of a conduit 15. The outlet of the cyclone 10 opens into the same conduit 15.

At the lower end of the cyclone 11 a powder bin 16 is provided, having an outlet 17 via which the dried and cooled powder flows through a sieve 18 to a storage space for instance a bag 19.

The gas outlet of the cyclone 10 is connected to the drying chamber 1 via a conduit 20. This connection is positioned in an area under the hood 21 which is rotatably supported about a shaft 22 in the chamber 1. The hood 21 is provided with a number of outflow orifices 23 turned to the bottom of the chamber 1 and with an outflow orifice 24 directed to the vaporizer 2. The hood 21 is further provided with outwardly protruding scrapers 25.

The installation operates as follows. Via the vaporizer 2 a liquid for instance milk is vaporized in the drying chamber 1. Simultaneously a heated gas having a temperature of e.g. 200° C. is introduced via the inlet 3 into the chamber 1 in such a manner that the vaporized liquid particles are evaporated and pulverulent solid particles are produced which flutter down to the bottom of the chamber 1. The powder and the gas in the chamber 1 are conveyed, via the outlet 4, to the separating cyclone 5. The powder lands in the bin 7 and leaves the separator via the outlet 8 and enters the conduit 9 of the cooling device. The gas from the drying chamber leaves the cyclone 5 via the outlet 6 whereby the temperature has fallen to for instance about 90° C.

The powder in the conduit 9 is conveyed to the first cooling cyclone 10 and finally lands in the conduit 15, where the powder is caught in the air current originated by the blower 13. This air current has been cooled down to a temperature of e.g. 5° C. by the cooler 14. The powder together with this conveying air enters the second cooling cyclone 11 and finally leaves the installation via the bin 7 and the outlet 17.

The powder issuing from the cyclone 10 has a temperature of about 50° C. and is cooled down to about 25° C. in the cyclone 11. The gas discharged from the cyclone 11 has the same temperature so that the conveying air in the conduit 9 has also a temperature of about 25° C. This air takes along the powder from the outlet 8 which has a temperature of about 90° C. In the cyclone 10 the temperature of the powder is reduced to about 50° C., while the temperature of the gas rises to the same value. The gas (in which are very small powder particles) flowing to the drying chamber 1 via the conduit 20 has therefore likewise a temperature of about 50° C.

The gas which via the conduit 20 is supplied to the space enclosed by the hood 21 in the drying chamber 1 issues for the greater part through the orifice 24, situated centrally under the vaporizer 2, whereby the particles taken along can adhere to other still moist particles. The risk of this supplied particles being burnt (for they are dry) is practically nil since they are protected from a direct contact with the heated gas from the inlet 3 by a haze screen originated by the vaporiser 2. Via the outflow openings 23 a part of the gas issuing from the conduit 20 is fed as cooling air to the powder on the bottom of the chamber 1.

The advantages of the installation according to the invention can be summarized as follows:

Due to the return via the conduit 20 the yield of very small particles decreases, while these particles are preserved since they grow to a greater size;

The cooling of the powder discharged from the drying chamber 1 is improved due to the outflow openings 23;

The efficiency of the cooling device 9–15 is improved due to the connection in tandem of the two cyclones 10 and 11, so that the same cooling effect with a smaller quantity of gas that is to say with less energy is obtained.

While preferred embodiments of the invention have been shown and described, it is to be understood that changes and variations may be made without departing from the spirit and scope of the invention as defined in the appended claims.

What I claim is:

1. An installation for preparing pulverulent material, such as milk powder, from a liquid, said installation comprising a spray drying chamber which at its upper end is provided with a spray atomizer and for the liquid and with an inlet for downwardly directed, heated gas disposed around the atomizer, said chamber being provided at its lower end with a common outlet for the discharge of the powder and the gas to a cyclone separator, the improvement consisting of a cooling circuit is provided for the powder issuing from the separator, said circuit comprising a source of pressurised gas and at least one additional cyclone separator, having an upper axial gas outlet and an upper tangential inlet, a powder conveying duct connecting the pressurized source to the bottom of the first mentioned cyclone separator to entrain powder therefrom and convey it to the inlet of the additional cyclone separator, the upper axial outlet of the latter being connected by a second duct to the drying chamber, said duct terminating in the chamber in a region situated contrally below the spray atomizer for the liquid.

2. An installation according to claim 1, characterized in that the second duct for the cooling gas to the drying chamber includes an upright frusto-conical, floor mounted hood within this chamber, the hood being provided with a number of outflow ducts directed to the bottom of the chamber, and with its upper discharge orifice directed to the atomizer.

3. An installation according to claim 2, characterized in that the hood is rotatably supported at the lower end of the drying chamber and is further provided with outwardly protruding scrapers which scrape the floor and sweep the collected powder into the common outlet.

4. An installation according to claim 1, characterized in that the said circuit comprises a further cyclone separator, the powder conveying duct entraining powder from the additional cyclone separator lower discharge port and conveying the powder to the upper tangential inlet of the further cyclone separator and then out of the upper axial discharge port of said further cyclone separator, powder being removed from the bottom discharge port of said further cyclone separator.

References Cited

UNITED STATES PATENTS

| | | | |
|---|---|---|---|
| 2,277,827 | 3/1942 | Heath et al. | 23—91 |
| 2,312,474 | 3/1943 | Peebles | 159—48 |
| 2,387,458 | 10/1945 | Mojonnier | 159—4 |
| 2,634,808 | 4/1953 | Arnold | 159—4 |
| 3,246,683 | 4/1966 | Yap et al. | 159—48 |

FOREIGN PATENTS

| | | |
|---|---|---|
| 439,911 | 10/1948 | Italy. |

NORMAN YUDKOFF, Primary Examiner

J. SOFER, Assistant Examiner

U.S. Cl. X.R.

99—203